US012268905B2

(12) United States Patent
Thompson et al.

(10) Patent No.: US 12,268,905 B2
(45) Date of Patent: Apr. 8, 2025

(54) SCBA FACEMASK ASSEMBLY WITH ACCELEROMETER TO EXTEND BATTERY LIFE OF ELECTRICAL COMPONENTS

(71) Applicant: 3M INNOVATIVE PROPERTIES COMPANY, St. Paul, MN (US)

(72) Inventors: Darin K. Thompson, Huntersville, NC (US); Ivan M. Delamer, Calgary (CA)

(73) Assignee: 3M Innovative Properties Company, St. Paul, MN (US)

(*) Notice: Subject to any disclaimer, the term of this patent is extended or adjusted under 35 U.S.C. 154(b) by 1032 days.

(21) Appl. No.: 17/283,334

(22) PCT Filed: Oct. 7, 2019

(86) PCT No.: PCT/IB2019/058533
§ 371 (c)(1),
(2) Date: Apr. 7, 2021

(87) PCT Pub. No.: WO2020/075045
PCT Pub. Date: Apr. 16, 2020

(65) Prior Publication Data

US 2022/0001219 A1 Jan. 6, 2022

Related U.S. Application Data

(60) Provisional application No. 61/745,154, filed on Oct. 12, 2018.

(51) Int. Cl.
*A62B 18/08* (2006.01)
*A62B 7/02* (2006.01)
(Continued)

(52) U.S. Cl.
CPC ................ *A62B 18/08* (2013.01); *A62B 7/02* (2013.01); *A62B 9/006* (2013.01); *A62B 9/022* (2013.01); *A62B 18/04* (2013.01)

(58) Field of Classification Search
CPC ........... A62B 18/08; A62B 7/02; A62B 9/006; A62B 9/022; A62B 18/04
See application file for complete search history.

(56) References Cited

U.S. PATENT DOCUMENTS 4,336,590 A * 6/1982 Jacq ........................ B64D 10/00 128/204.22
5,089,914 A * 2/1992 Prescott ................. G02B 23/12 2/5

(Continued)

FOREIGN PATENT DOCUMENTS

CN 104320545 A 1/2015
DE 4013678 A1 * 11/1990

(Continued)

OTHER PUBLICATIONS

Data Sheet: “ADXL343—Digital MEMS Accelerometer” Analog Devices Inc. 2012, 36 pages.

(Continued)

*Primary Examiner* — Tu A Vo
(74) *Attorney, Agent, or Firm* — Kenneth B Wood

(57) ABSTRACT

A facemask assembly for a self-contained breathing apparatus includes a facemask configured to be worn by a user, an electronic device connected with the facemask, a microcontroller configured to send signals to the electronic device, an accelerometer coupled with the microcontroller and configured to sense motion of the facemask; and a battery configured to supply power to the electronic device. When motion is detected by the accelerometer, a signal is transmitted to the microcontroller and the microcontroller interprets the electrical signal to selectively adjust the power level supplied to the electronic device.

13 Claims, 5 Drawing Sheets

(51) Int. Cl.

| | |
|---|---|
| ***A62B 9/00*** | (2006.01) |
| ***A62B 9/02*** | (2006.01) |
| ***A62B 18/04*** | (2006.01) |

(56) References Cited

U.S. PATENT DOCUMENTS

| | | | | |
|---|---|---|---|---|
| 5,949,582 | A * | 9/1999 | Coombs | G02B 27/0176 348/E5.09 |
| 6,016,160 | A * | 1/2000 | Coombs | G02B 27/0176 348/64 |
| 6,091,331 | A * | 7/2000 | Toft | G08B 25/10 340/532 |
| 7,263,379 | B1 * | 8/2007 | Parkulo | G08B 25/009 370/254 |
| 7,460,304 | B1 * | 12/2008 | Epstein | G02B 27/017 359/356 |
| 9,848,666 | B1 * | 12/2017 | Egeland | A42B 3/0466 |
| 9,998,687 | B2 * | 6/2018 | Lavoie | H04N 23/55 |
| 10,420,965 | B1 * | 9/2019 | Dykes | A62B 18/08 |
| 2003/0122958 | A1 * | 7/2003 | Olita | H04N 23/50 348/E5.025 |
| 2004/0168855 | A1 * | 9/2004 | Leon | A62B 1/08 182/236 |
| 2010/0300436 | A1 | 12/2010 | McKeown | |
| 2013/0194100 | A1 * | 8/2013 | Granhed | A63B 29/021 340/584 |
| 2015/0121684 | A1 | 5/2015 | Kuutti | |
| 2015/0206290 | A1 * | 7/2015 | Ryu | G06T 5/73 382/255 |
| 2015/0217143 | A1 | 8/2015 | Palmer | |
| 2017/0312556 | A1 | 11/2017 | Smith | |
| 2017/0361132 | A1 * | 12/2017 | Dykes | G01C 21/166 |
| 2018/0270549 | A1 * | 9/2018 | Awiszus | A61F 9/06 |
| 2018/0325422 | A1 * | 11/2018 | Sokol | A62B 7/10 |
| 2020/0015536 | A1 * | 1/2020 | Ciccaglione | A62B 18/08 |

FOREIGN PATENT DOCUMENTS

| | | | | |
|---|---|---|---|---|
| EP | 2645349 A1 * | 10/2013 | A62B 1/04 |
| WO | WO 2016/090377 | 6/2016 | |
| WO | WO 2017-062709 | 4/2017 | |
| WO | WO 2017/176984 | 10/2017 | |
| WO | WO 2017-180940 | 10/2017 | |
| WO | WO 2017-180951 | 10/2017 | |
| WO | WO 2017-181064 | 10/2017 | |
| WO | WO-2017176984 A1 * | 10/2017 | A62B 18/02 |
| WO | WO-2017181036 A1 * | 10/2017 | A62B 18/02 |

OTHER PUBLICATIONS

"Harmony Universal Remotes", Logitech, (Date unknown but believed to be prior to the date of the filing of the present application.), [retrieved from the internet on Jun. 6, 2021], URL <https://www.logitech.com/en-us/harmony-universal-remotes>, 2 pages.

International Search Report for PCT International Application No. PCT/IB2019/058533, mailed on Jan. 10, 2020, 3 pages.

* cited by examiner

SCBA FACEMASK ASSEMBLY WITH ACCELEROMETER TO EXTEND BATTERY LIFE OF ELECTRICAL COMPONENTS

BACKGROUND

The present invention relates generally to self-contained breathing apparatuses (SCBAs) and, more particularly, to an SCBA facemask assembly including electrical components that are selectively activated and de-activated to extend battery life.

SCBAs are devices used by, for example, first responders such as firefighters, law enforcement, military and other rescue and emergency workers, when operating in hazardous or dangerous environments. An SCBA typically includes several primary components including a pressure air tank or cylinder, at least one pressure regulator, a facemask, and a carrying frame or support assembly to support the cylinder and related items on the back of a user. SCBAs continue to be an indispensable piece of equipment in a wide variety of situations and environments.

SUMMARY

There continues to be a need to improve the performance and use of self-contained breathing apparatus (SCBA) equipment and related accessories. In particular, there is an ongoing desire to incorporate additional functionality into SCBA equipment, such as electronic components and accessories, and to improve the reliability and maintenance of such electronics. The present disclosure provides a breathing apparatus, such as a self-contained breathing apparatus (SCBA) including, for example, a pressure air tank or cylinder, a pressure regulator, a facemask, and a carrying frame or support assembly that is worn by the user.

Portable or handheld electronic devices may include auto shutoffs that utilize timers and/or audio level sensors. Such approaches, however, are prone to function inconsistently depending on the environment.

Electronic components in SCBA facemasks may be maintained in an active or "on" mode and therefore fully operational even when they are not in use. Electronic components may include, for example, lights, alarms or alerts (e.g. sound and/or vibration), communication accessories (e.g. microphones, headphones, amplifiers), cameras and/or visual displays. Such electronic components may sit idle without being used for long periods of time, such as when the SCBA equipment is stored between uses. Electronic components in SCBA facemasks may include manual on/off buttons that are actuated by the user. For example, a facemask assembly may include a thermal camera with an on/off switch that is manually actuated by a user to turn the camera on and manually actuated by the user to turn the camera off. Depending on the circumstances, these tasks may need to be accomplished when the user is wearing bulky protective gloves, thereby limiting the dexterity of the user and making the task more difficult. In addition, the image display unit that creates and displays the thermal image captures by the camera may have its own separate on/off switch. Because the display and the on/off switch are typically located within the facemask assembly, the on/off switch is not readily accessible once the facemask assembly is donned by the user. That is, if the user dons the facemask assembly prior to turning on the display unit, the user would need to take the facemask assembly off in order to activate the display unit. In addition, after use, the user must remember to turn off both the thermal imaging camera and the display unit, otherwise these electronic components will remain active and operational even when not in use. Maintaining the electronic components in an active state will, of course, drain the battery, thereby resulting in frequent battery replacement. Frequent battery replacement can be tedious and inconvenient, results in additional cost, and produces waste.

In one embodiment, the present invention is directed to a facemask assembly with an integrated accelerometer for use in a self-contained breathing apparatus (SCBA). The facemask assembly uses the accelerometer to determine if the facemask assembly is moving, whereby the electronic components of the facemask assembly should be in an active or awake state, or if the facemask assembly is stationary (i.e. not moving, such as when the SCBA is being stored between uses), and the electronic components of the facemask assembly should be in a deactivated or dormant state. Accordingly, when the accelerometer detects a lack of movement, power delivery to the electronic components is suspended, thereby extending the life of the battery, and when the accelerometer detects motion, power is supplied to the electronic components so they are operational.

In a specific embodiment, the present disclosure provides a facemask assembly for a self-contained breathing apparatus wherein the facemask assembly comprises a facemask configured to be worn by a user; an electronic device, such as a thermal imaging camera and/or in-mask display unit connected with the facemask, an accelerometer configured to detect motion of the facemask assembly; a microcontroller coupled with the accelerometer and configured to send signals to the electronic device in response to motion detected by the accelerometer; and a battery configured to supply power to the electronic device. When motion is detected by the accelerometer, a signal is transmitted to the microcontroller and the microcontroller interprets the signal to selectively adjust the power level supplied to the electronic device. For example, the microcontroller may send a signal to turn the electronic device on or off.

Advantages of certain embodiments of the SCBA facemask assembly described herein include eliminating the need to manually active and/or de-active electronic components associated with an SCBA facemask assembly, reducing the frequency with which batteries must be replaced, and reducing battery drain and thereby increasing battery life.

DETAILED DESCRIPTION

Figure 1:
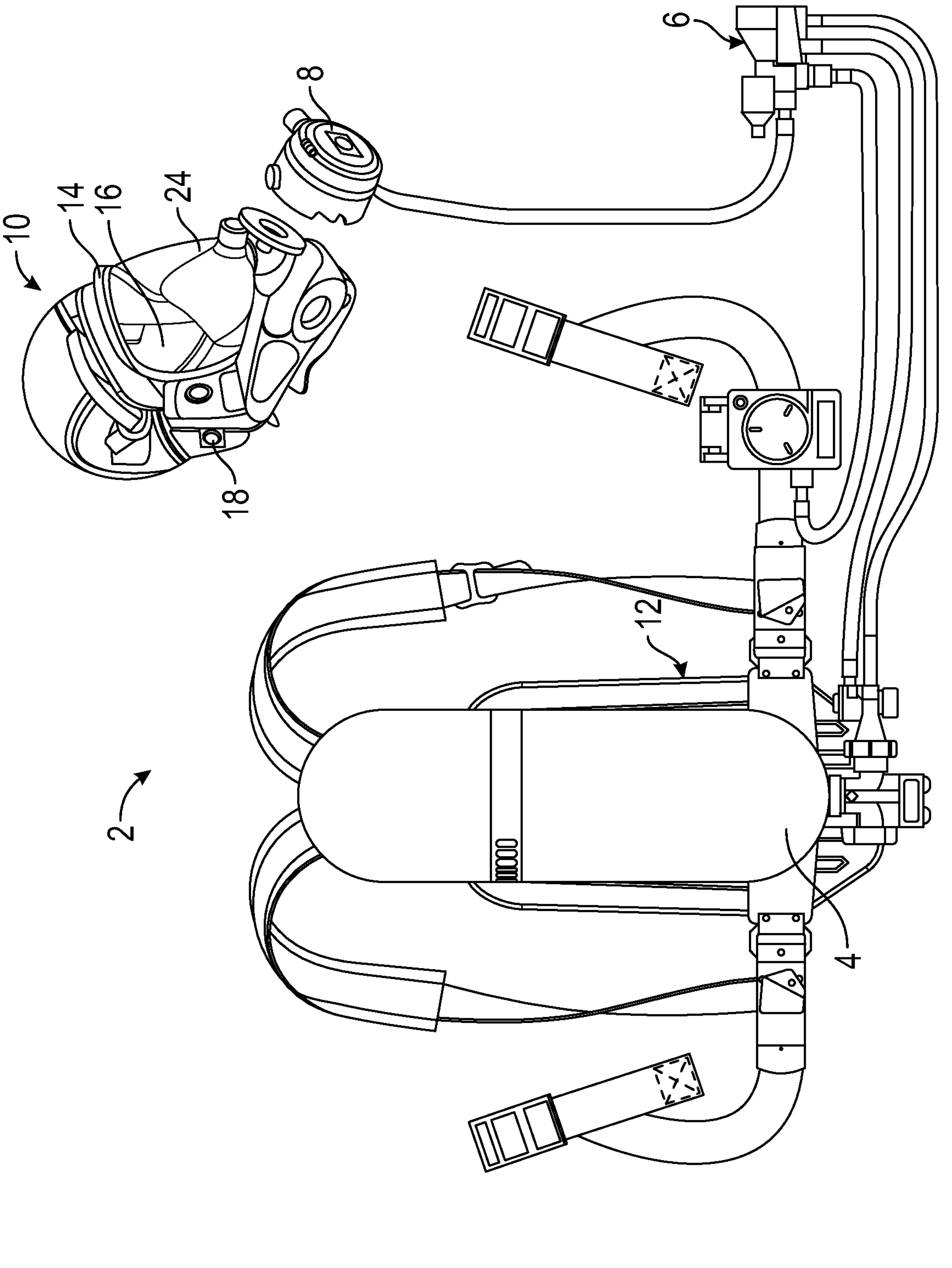
FIG. 1 is a diagrammatic illustration of a SCBA according to an embodiment of the invention.

Referring now to the drawings, wherein like reference numerals refer to like or corresponding parts throughout the several views, FIG. 1 generally shows a self-contained breathing apparatus (SCBA) 2 including a pressure air tank or cylinder 4, a first pressure regulator 6, a second pressure regulator 8, a facemask assembly 10, and a carrying frame or support assembly 12 that is worn by the user.

The facemask assembly 10 includes a facemask 14 that is worn on the head and face of a user. When donned by the user, the facemask 14 defines an open interior region 16 adjacent the user's face. The facemask assembly 10 further includes at least one electronic component integrated with the facemask 14. Electronic components may include, for example, lights, haptic alerts or alarms, communication accessories, cameras and/or displays. In the illustrated embodiment, the facemask assembly 10 includes a thermal imaging camera 18 mounted on the side of the facemask 14. The facemask assembly 10 is further described in U.S. Patent Application No. 62/322,936, the entire contents of which are hereby incorporated by reference.

Figure 2A:
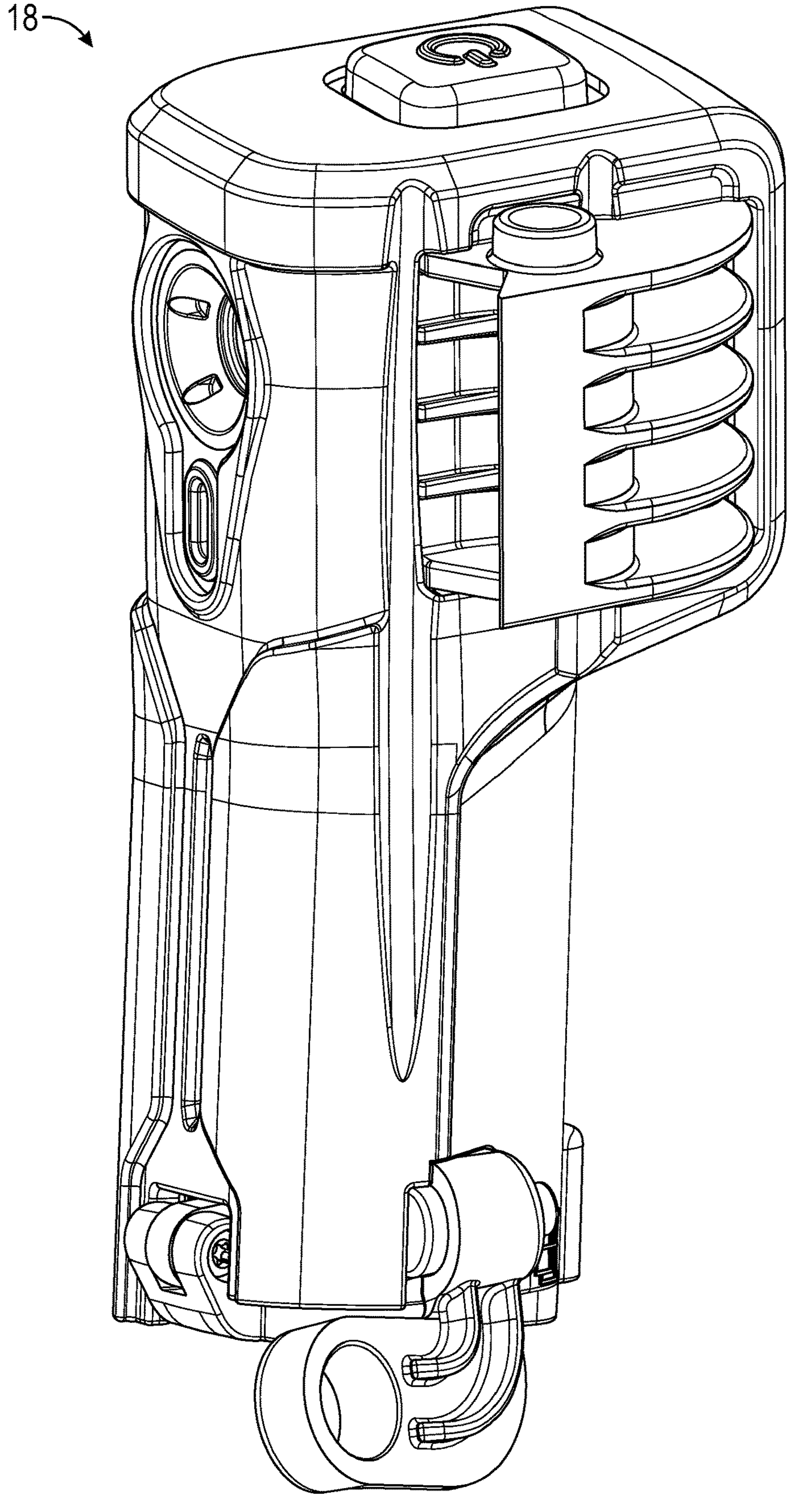
FIG. 2A is a perspective view of a thermal imaging camera for use in the SCBA of FIG. 1.
Figure 2B:
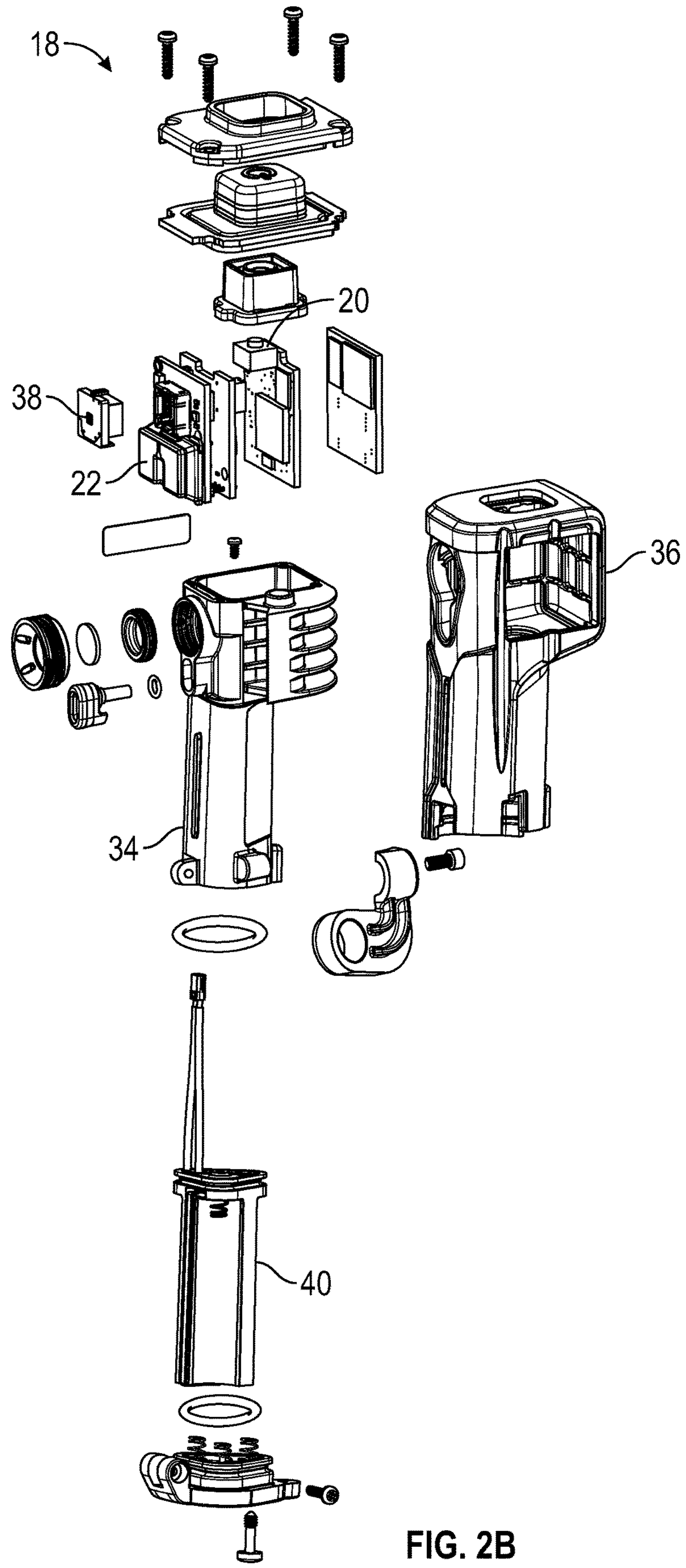
FIG. 2B is an exploded view of the thermal imaging camera of FIG. 2A.

Referring to FIGS. 2A and 2B, in accordance with one aspect of the facemask assembly 10, the thermal imaging camera 18 generally includes a main housing 34, a cover 36, a thermal imager camera core 38, an accelerometer 20, a microcontroller 22, and a battery 40. As described in more detail below, the accelerometer 20 is configured to detect motion and/or the orientation of the facemask assembly 10, and transmit data to the microcontroller. The microcontroller 22 is a printed circuit board that is coupled with the accelerometer 20. The microcontroller 22 is configured to interpret information from the accelerometer in the form of, for example, data or signals, and transmit signals to one or more electronic components. The accelerometer 20 and microcontroller 22 may communicate with each other via hardwired connection or via wireless connection. Likewise, the microcontroller 22 may be hardwired to the electronic components or communicate with the electronic components via wireless connection.

In the illustrated embodiment, the microcontroller 22 is configured to send signals to the thermal imaging camera 18 in response to motion detected by the accelerometer 20. It will be recognized that the microcontroller 22 may be configured to communicate with any electronic components incorporated into the facemask assembly 10, other devices or electronic components associated with the SCBA 2, or separate devices or equipment not associated with the facemask assembly 10 or SCBA 2.

The battery 40 is configured to supply the power needed to operate the thermal imaging camera 18. The particular battery is not significant to the invention hereof, so long as it provides sufficient power to operate the associated thermal imaging camera 18. Suitable batteries include a wide variety of commercially available household batteries such as disposable (e.g. alkaline, lithium) and rechargeable (e.g. nickel-metal hydride, nickel-zinc) batteries.

In operation, when motion is detected by the accelerometer 20, a signal (e.g. electrical or optical signal) is transmitted to the microcontroller 22, and the microcontroller 22 interprets the signal to selectively adjust the power level supplied to the electronic device. For example, in the illustrated embodiment, if the accelerometer 22 detects motion, the microcontroller 22 may send a signal to the thermal imaging camera 18 to turn on (i.e. activate) the thermal imaging camera 18. Alternatively, if the accelerometer 22 does not detect motion for a certain period of time, the microcontroller 22 may send a signal to the thermal imaging camera to turn off the thermal imaging camera 18 or have it operate in a reduced power state.

When the thermal imaging camera 18 is not active or operational and the microcontroller 22 is operating in a low power mode, the accelerometer 20 may try to detect the presence of motion once every k seconds. In one example, k may be 1 second meaning the accelerometer 20 will try to sense motion of the facemask assembly 10 once every second when the thermal imaging camera 18 is off or inactive. As long as no motion is detected, the microcontroller will continue to operate in a low power mode and the thermal imaging camera 18 will remain inactive. That is, if the facemask assembly 10 is stationary, then there is no reason to maintain the thermal imaging camera 18 in an enabled state. Thus, the microcontroller 22 causes the thermal imaging camera to be dormant, thereby saving battery power.

When the accelerometer 20 detects motion, the accelerometer 20 will wake up the microcontroller 22, whereby the microcontroller 22 will be able to transmit signals to the thermal imaging camera 18.

In one embodiment, the accelerometer 20 is configured to detect motion of the facemask assembly 10. Such motion may be due to, for example, motion generated by the user or motion generated by a vehicle. User generated motion may result, for example, from the user picking-up the facemask assembly 10 or from the user carrying or wearing the facemask assembly 10 and moving about (e.g. walking or running) Alternatively, vehicle generated motion of the facemask assembly 10 may be result from the facemask assembly 10 being transported in a vehicle. Because these situations may impact whether a particular electronic component should be activated, in a specific embodiment, the microcontroller 22 is configured to differentiate between motion created by the user and motion created by a vehicle transporting the facemask.

In another embodiment, the accelerometer 20 is configured to detect the orientation of the facemask assembly 10. That is, the accelerometer 20 is configured to detect whether the facemask assembly 10 is in a vertical or horizontal orientation. In this manner, the accelerometer is able to detect whether a user is upright or laying down, for example, on the ground or on a floor. In yet another embodiment, the accelerometer 20 and microcontroller 22 may be configured to detect blunt force impact. Such information can be transmitted to other personnel in the vicinity who can provide assistance, and/or to an incident commander who can request or deploy additional resources to address the situation.

The particular accelerometer 20 is not significant to the invention hereof, so long as it provides desired functions. In specific embodiment, the accelerometer 20 may be, for example, a piezo-electric and a piezo-resistive accelerometer.

In the illustrated embodiment, the facemask assembly 10 includes a thermal imaging camera arranged on the outside of the facemask. In addition, the facemask assembly 10 may include an in-mask display unit 24 located within the interior region 16 of the facemask assembly 10. The in-mask display unit 24 is configured to create and display an image from the data transmitted from the thermal imaging camera 18.

Figure 3A:
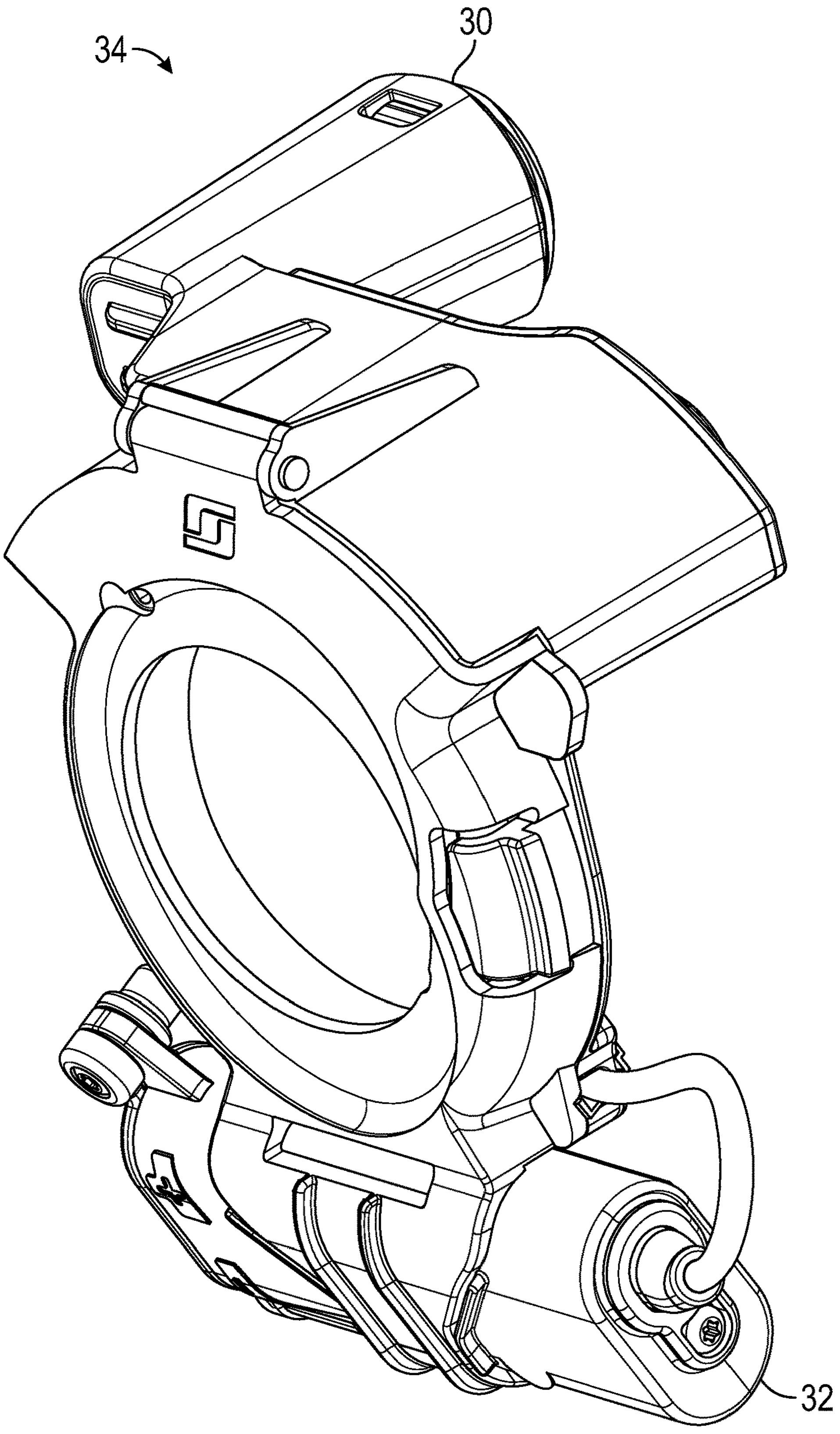
FIG. 3A is a perspective view of the in-mask display unit for use in the SCBA of FIG. 1.
Figure 3B:
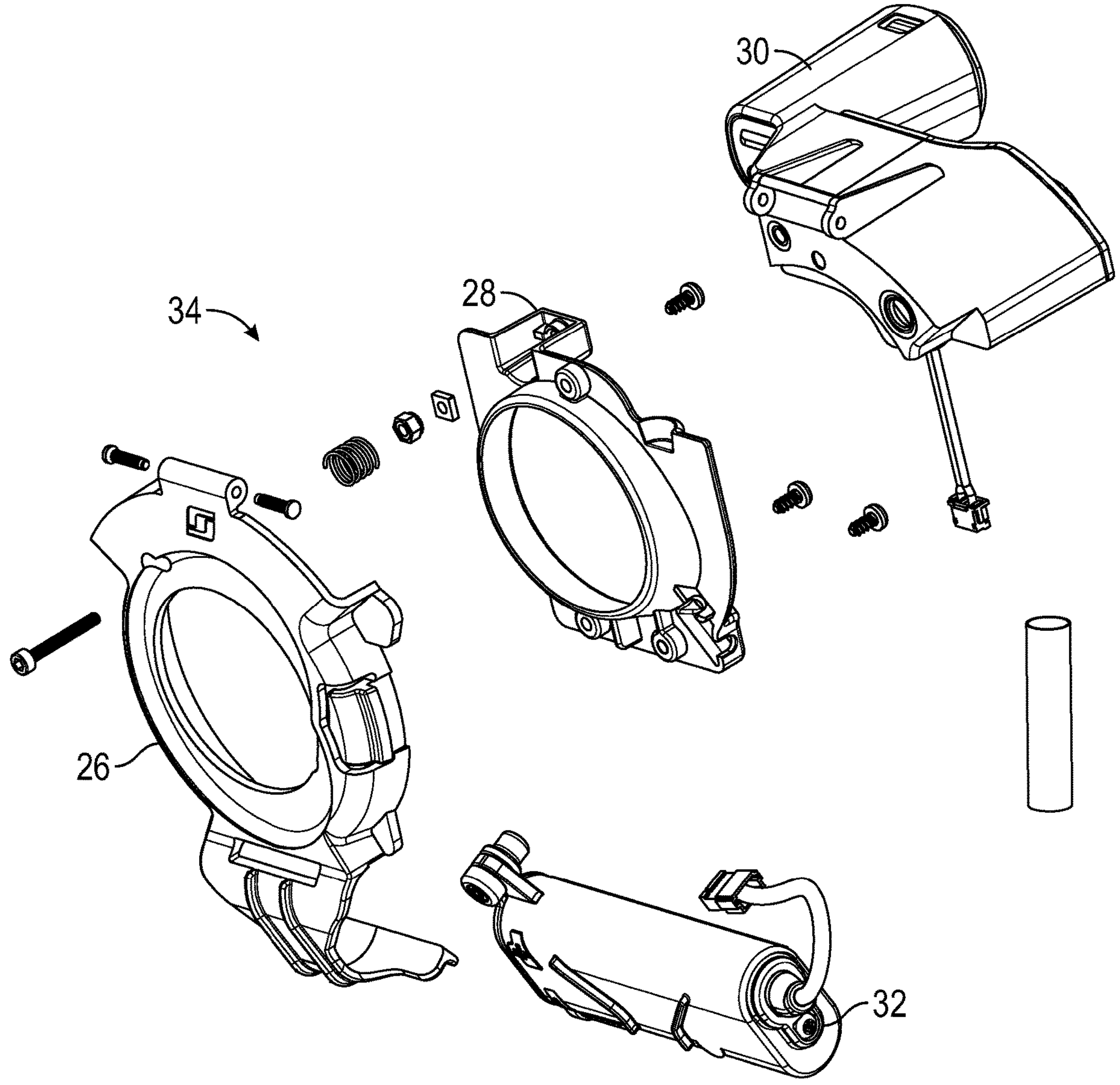
FIG. 3B is an exploded view of the in-mask display of FIG. 3A.

Referring to FIGS. 3A and 3B, the in-mask display unit 24 includes a chassis 26, a chassis cover 28, a viewfinder 30 and a battery 32. The battery 32 is configured to supply the power needed to operate the in-mask display 24. The particular battery is not significant to the invention hereof, so long as it provides sufficient power to operate the associated in-mask display 24. Suitable batteries include a wide variety of commercially available household batteries such as disposable (e.g. alkaline, lithium) and rechargeable (e.g. nickel-metal hydride, nickel-zinc) batteries. The in-mask display 24 can communicate with the in-mask display via wired or wireless (e.g. Bluetooth) connection. Other aspects of the thermal imaging camera 18 and in-mask display 24 are described in WO2017/062709, the entire contents of which are hereby incorporated by reference.

In one embodiment, the accelerometer 20 may be configured to provide image stabilization. In this manner, the accelerometer 20 may serve to cancel out unintended motion or reduce blur in the image displayed in the viewfinder of the in-mask display 24.

Persons of ordinary skill in the art may appreciate that various changes and modifications may be made to the invention described above without deviating from the inventive concept. Thus, the scope of the present invention should not be limited to the structures described in this application, but only by the structures described by the language of the claims and the equivalents of those structures.

The following exemplary embodiments are provided, the numbering of which is not to be construed as designating levels of importance:

Embodiment 1 provides a self-contained breathing apparatus facemask assembly comprising:

a. a facemask configured to be worn by a user, the facemask defining an interior region adjacent the user's face when the facemask is donned by the user;
b. an electronic device connected with the facemask;
c. an accelerometer configured to detect motion of the facemask;
d. a microcontroller coupled with the accelerometer and configured to send signals to the electronic device in response to motion detected by the accelerometer; and
e. a battery configured to supply power to the electronic device;

wherein when motion is detected by the accelerometer, a signal is transmitted to the microcontroller and the microcontroller interprets the electrical signal to selectively adjust the power level supplied to the electronic device.

Embodiment 2 provides a self-contained breathing apparatus facemask assembly as defined in embodiment 1, wherein the accelerometer is configured to detect motion of the facemask assembly. Embodiment 3 provides a self-contained breathing apparatus facemask assembly as defined in embodiment 1, wherein the microcontroller is configured to differentiate between motion of the facemask assembly created by motion of the user and motion created by a vehicle.

Embodiment 4 provides a self-contained breathing apparatus facemask assembly as defined in embodiments 1-3, wherein the accelerometer and/or microcontroller are configured to detect and/or determine the orientation of the facemask.

Embodiment 5 provides a self-contained breathing apparatus facemask assembly as defined in embodiments 1-4, wherein the accelerometer and/or microcontroller are configured to detect and/or determine whether the facemask assembly is in a vertical or horizontal orientation.

Embodiment 6 provides a self-contained breathing apparatus facemask assembly as defined in embodiments 1-5, wherein the accelerometer and microcontroller are configured to detect blunt force impact.

Embodiment 7 provides a self-contained breathing apparatus facemask assembly as defined in embodiments 1-6, wherein the accelerometer is at least one of a piezo-electric and a piezo-resistive accelerometer.

Embodiment 8 provides a self-contained breathing apparatus facemask assembly as defined in embodiments 1-7, wherein the facemask assembly electronic components comprises at least one of a visual alert, an audible alert, a haptic alert and a communication accessory.

Embodiment 9 provides a self-contained breathing apparatus facemask assembly as defined in embodiments 1-8, wherein electronic component comprises a thermal imaging camera arranged in the interior region of the facemask.

Embodiment 10 provides a self-contained breathing apparatus facemask assembly as defined in embodiment 9, wherein the electronic component comprises a display unit having a viewfinder arranged in the interior region of the facemask assembly configured to display the image from the thermal imaging camera.

Embodiment 11 provides a self-contained breathing apparatus facemask assembly as defined in embodiment 10, wherein the accelerometer is configured to provide image stabilization.

Embodiment 12 provides a self-contained breathing apparatus facemask assembly as defined in embodiment 11, wherein the thermal imaging camera includes a battery for powering at least the thermal imaging camera, and further wherein the thermal imaging camera includes an accelerometer configured to sense the user's motion and in response to the sensed motion, automatically selectively adjust the power supplied to at least one of the thermal imaging camera and the display unit.

Embodiment 13 provides a self-contained breathing apparatus facemask assembly as defined in embodiment 1, wherein the facemask assembly further comprises a regulator.

Embodiment 14 provides a self-contained breathing apparatus comprising the facemask assembly of embodiment 1, wherein the self-contained breathing apparatus includes a pressure air tank or cylinder, a first pressure regulator, a second pressure regulator, and a support assembly.

What is claimed is:

1. A self-contained breathing apparatus facemask assembly comprising:

a) a facemask configured to be worn by a user, the facemask defining an interior region adjacent the user's face when the facemask is donned by the user;
b) an electronic device connected with the facemask;
c) an accelerometer configured to detect motion of the facemask;
d) a microcontroller coupled with the accelerometer and configured to send signals to the electronic device in response to the motion detected by the accelerometer; and
e) a battery configured to supply power to the electronic device;

wherein when the motion is detected by the accelerometer, a signal is transmitted to the microcontroller and the microcontroller interprets the signal to selectively adjust the power level supplied to the electronic device;

wherein the microcontroller is configured to differentiate between motion of the facemask assembly created by motion of the user and motion created by a vehicle.

2. The self-contained breathing apparatus facemask assembly as defined in claim 1, wherein the accelerometer is configured to detect the motion of the facemask assembly.

3. The self-contained breathing apparatus facemask assembly as defined in claim 1, further wherein the accelerometer is configured to detect an orientation of the facemask.

4. The self-contained breathing apparatus facemask assembly as defined in claim 1, wherein the accelerometer is configured to detect whether the facemask assembly is in a vertical or a horizontal orientation.

5. The self-contained breathing apparatus facemask assembly as defined in claim 1, wherein the accelerometer and the microcontroller are configured to detect a blunt force impact.

6. The self-contained breathing apparatus facemask assembly as defined in claim 1, wherein the accelerometer is a piezo-electric accelerometer or a piezo-resistive accelerometer.

7. The self-contained breathing apparatus facemask assembly as defined in claim 1, wherein the electronic device comprises a communication accessory.

8. The self-contained breathing apparatus facemask assembly as defined in claim 1, wherein the electronic device comprises a thermal imaging camera arranged in the interior region of the facemask.

9. The self-contained breathing apparatus facemask assembly as defined in claim 8, wherein the electronic device comprises a display unit having a viewfinder arranged in the interior region of the facemask assembly configured to display an image from the thermal imaging camera.

10. The self-contained breathing apparatus facemask assembly as defined in claim 9, wherein the accelerometer is configured to provide image stabilization for the image generated from the thermal imaging camera.

11. The self-contained breathing apparatus facemask assembly as defined in claim 10, wherein the thermal imaging camera includes a second battery for powering at least the thermal imaging camera, and further wherein the thermal imaging camera includes the accelerometer configured to sense the user's motion and in response the sensed motion, automatically selectively adjust the power supplied to at least one from the group consisting of the thermal imaging camera and the display unit.

12. The self-contained breathing apparatus facemask assembly as defined in claim 1, wherein the facemask assembly further comprises a regulator.

13. The self-contained breathing apparatus comprising the facemask assembly of claim 1, wherein the self-contained breathing apparatus includes a pressure air tank or cylinder, a first pressure regulator, a second pressure regulator, and a support assembly.

* * * * *